United States Patent
Dayringer et al.

(10) Patent No.: US 10,804,027 B2
(45) Date of Patent: Oct. 13, 2020

(54) HOLLOW CORE ELECTROMAGNETIC COIL

(71) Applicant: GOOGLE LLC, Mountain View, CA (US)

(72) Inventors: Eric Dayringer, Mountain View, CA (US); Chintan Trehan, San Jose, CA (US); Bhaskar Vadathavoor, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/244,552

(22) Filed: Jan. 10, 2019

(65) Prior Publication Data

US 2019/0244746 A1    Aug. 8, 2019

Related U.S. Application Data

(60) Provisional application No. 62/627,055, filed on Feb. 6, 2018.

(51) Int. Cl.
*H01F 27/28* (2006.01)
*G06F 3/01* (2006.01)
(Continued)

(52) U.S. Cl.
CPC ......... *H01F 27/2847* (2013.01); *G06F 1/163* (2013.01); *G06F 3/011* (2013.01);
(Continued)

(58) Field of Classification Search
CPC .... H01F 27/2847; H01F 27/245; H01F 27/28; H01F 27/32; H01F 2027/2857;
(Continued)

(56) References Cited

U.S. PATENT DOCUMENTS 4,963,818 A * 10/1990 Obama ................. G01R 15/20
                                                        324/117 R
5,559,432 A    9/1996 Logue
(Continued)

FOREIGN PATENT DOCUMENTS

EP            1806756 B1      8/2017
WO         2016094865        12/2015
(Continued)

OTHER PUBLICATIONS

International Search Report and Written Opinion dated May 3, 2019 for corresponding International Application No. PCT/US2019/015610, 14 pages.
(Continued)

*Primary Examiner* — Xuemei Zheng

(57) ABSTRACT

An augmented reality/virtual reality (AR/VR) system employs a tracking system for tracking one or more components of the AR/VR system using a generated electromagnetic (EM) field. The tracking system employs an EM coil for generating the EM field or, alternatively, sensing the EM field. The EM coil includes a core substrate and thin metal foil wrapped around the core substrate in three orthogonal axes. The EM coil is effectively "hollow" in that it weighs less than a conventional solid ferrite or ferrous core of comparable dimensions, either through the use of one or more openings formed in the core substrate, the use of a material less dense than ferrite or ferrous materials, the formation of the core substrate as a hollow framework, or a combination thereof. The resulting EM coil thus weighs less than conventional solid-core EM coils, thereby reducing user fatigue and the possibility of misalignment of the EM coil as a result from a drop impact of the device implementing the EM coil.

19 Claims, 4 Drawing Sheets

(51) Int. Cl.
*G06F 3/0346* (2013.01)
*H01F 5/02* (2006.01)
*H01F 5/00* (2006.01)
*G06F 1/16* (2006.01)

(52) U.S. Cl.
CPC ............ *G06F 3/012* (2013.01); *G06F 3/0346* (2013.01); *H01F 5/00* (2013.01); *H01F 5/02* (2013.01); *H01F 2005/027* (2013.01); *H01F 2027/2857* (2013.01)

(58) Field of Classification Search
CPC ... H01F 5/00; H01F 5/02; G06F 1/163; G06F 3/011; G06F 3/012; G06F 3/0346
See application file for complete search history.

(56) References Cited

U.S. PATENT DOCUMENTS

| | | |
|---|---|---|
| 8,994,366 B2 | 3/2015 | Ashe |
| 9,427,172 B2 | 8/2016 | Eichler et al. |
| 2006/0025677 A1* | 2/2006 | Verard .................. A61B 90/36 600/423 |
| 2009/0278418 A1* | 11/2009 | Ke ............................ H01F 5/02 310/194 |
| 2013/0200974 A1* | 8/2013 | Markowski ......... H01F 27/2804 336/170 |
| 2016/0259404 A1 | 9/2016 | Woods |
| 2019/0164680 A1* | 5/2019 | Cobos Reyes ............ H01F 3/10 |

FOREIGN PATENT DOCUMENTS

| | | |
|---|---|---|
| WO | 2016094865 A1 | 6/2016 |
| WO | 2017017659 | 7/2016 |
| WO | 2017017659 A1 | 2/2017 |

OTHER PUBLICATIONS

U.S. Appl. No. 62/627,055, filed Feb. 6, 2018, listing Eric Dayringer et al. as inventors, entitled "Hollow Core Electromagnetic Coil".

* cited by examiner

HOLLOW CORE ELECTROMAGNETIC COIL

CROSS-REFERENCE TO RELATED APPLICATIONS

The present application claims priority to U.S. Patent Application Ser. No. 62/627,055, entitled "Hollow Core Electromagnetic Coil" and filed on Feb. 6, 2018, the entirety of which is incorporated by reference herein.

BACKGROUND

Electromagnetic (EM) sensing increasingly is used for tracking purposes in virtual reality (VR) and augmented reality (AR) applications. Tracking systems using EM sensing typically employ an EM coil to generate a strong EM field, and another EM coil to detect a pose or position based on the generated EM field. The transmit-side EM coil generates a three-dimensional (3D) EM field, and the receive-side EM coil outputs one or more voltages, each of the output voltages representing a corresponding positional value with reference to a three degrees of freedom (3DOF) or six degrees of freedom (6DOF) reference frame defined by the 3D EM field. Conventional EM coils employ conductive wiring wrapped around a solid ferrite core. While providing relatively high EM sensitivity, the solid ferrite core is relatively heavy, which in turn increases the weight of the user-held or user-mounted component employing the conventional EM coil, and thus impacting user comfort. Moreover, the heavy solid core of a conventional EM coil results in the conventional EM coil having higher mass. This results in conventional EM coils being susceptible to dislocation due to drop impacts, with such a dislocation shifting the position of the EM coil and thus negatively impacting its accuracy with regard to factory tracking calibration.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate systems and techniques for tracking in an augmented reality (AR) or virtual reality (VR) system (referred to collectively and in the alternative as an AR/VR system) using a "hollow-core" electromagnetic (EM) coil. The term "hollow-core" refers to the use of a core substrate that has less mass than the conventional solid ferrite core or solid ferrous core of comparable external dimensions (i.e., of comparable external volume). In particular, the core substrate may be implemented as a "hollow-core" through the use of materials with a lower density than ferrite or iron, such as plastic materials, through the formation of through-holes or other voids in the body of the core substrate, through the use of a lattice-like hollow-frame structure, or a combination thereof. The core substrate is wrapped in three orthogonal directions with strips of thin metal foil, which may be excited with corresponding alternating current (AC) signals to generate a three-dimensional EM field, or which may be used to generate voltages representative of a position and/or orientation of the hollow-core EM coil within a generated 3D EM field. The thin metal foil is composed of a metal with high magnetic permeability (that is, a magnetic permeability higher than pure iron), such as an amorphous metal foil or nanocrystalline metal foil. The combination of the lightweight nature of the hollow core and the thin and lightweight nature of the thin metal foil while providing high magnetic permeability allows the hollow-core EM coil to provide similar EM field generation or EM field sensing performance of a conventional solid-core EM coil of comparable external dimensions while weighing considerably less. The hollow-core EM coil is lighter than conventional EM coils of comparable dimensions, and thus contributes less to user fatigue and is less susceptible to being dislocated as a result of a drop impact.

Figure 1:
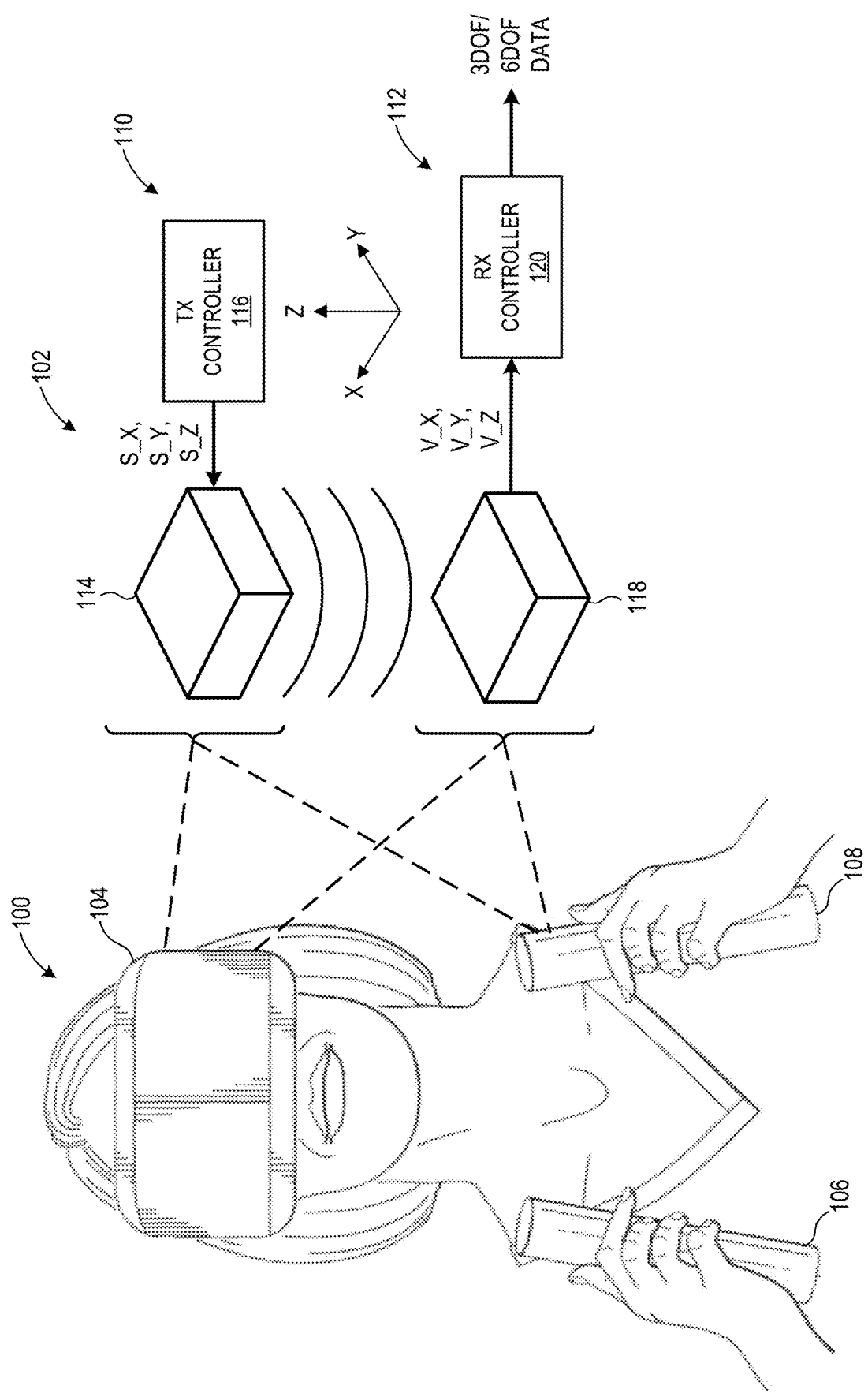
FIG. 1 is a block diagram of an augmented reality/virtual reality system having a tracker system employing a hollow-core electromagnetic (EM) coil in accordance with some embodiments.

FIG. 1 illustrates an AR/VR system 100 employing an EM-based tracking system 102 with a hollow-core EM coil in accordance with some embodiments of the present disclosure. The AR/VR system 100 includes a head mounted display (HMD) device 104 for displaying AR or VR content and one or more hand-held controllers, such as hand-held controllers 106, 108. To facilitate tracking in the AR/VR system 100, such as tracking a position or orientation (referred to herein collectively or in the alternative as "pose") the HMD device 104, a pose of the hand-held controllers 106, 108 relative to the HMD device 104 or other component, and the like, the AR/VR system 100 employs the EM-based tracking system 102.

The EM-based tracking system 102 includes an EM field generation subsystem 110 and an EM field sensing subsystem 112. The EM field generation subsystem 110 includes a 3D EM coil 114 and a transmission (TX) controller 116. The 3D EM coil 114 is configured to generate a 3D EM field in the X, Y, and Z planes, and the TX controller 116 controls the generation of the EM field in each of these planes through control of AC signals S_X, S_Y, and S_Z input to the EM coil 114. The EM field sensing subsystem 112 includes a 3D EM coil 118 and a receive (RX) controller 120. The 3D EM coil 118 is configured to sense the generated 3D EM field in each of the X, Y, Z planes and to output a corresponding voltage signal V_X, V_Y, and V_Z to the RX controller 120. The RX controller 120 then utilizes these three voltage signals to generate three degrees of freedom (3DOF) (position) or six degrees of freedom (6DOF) (position and orientation) data representing the position and/or orientation of the EM coil 118 with respect to the generated EM field.

In embodiments in which the pose of the HMD device 104 is being tracked, the EM field sensing subsystem 112 is implemented at the HMD device 104 and the EM field generation subsystem 110 is implemented external to the HMD device 104. In embodiments wherein the poses of the handheld controllers 106, 108 are being tracked relative to the HMD device 104, the EM field generation subsystem 110 is implemented at the HMD device 104 and an instance of the EM field sensing subsystem 112 is implemented at each of the handheld controllers 106, 108. Other tracking/tracked configurations may be implemented with respect to the HMD device 104 and the handheld controllers 106, 108 using the guidelines provided herein.

In at least one embodiment, one or both of the EM coils 114, 116 implement a hollow-core configuration in which the core of the EM coil is implemented as a "hollow core" wrapped in three orthogonal directions by an amorphous or nanocrystalline thin metal foil. The hollow core is "hollow" in that it has a lower weight than a solid ferrite core or solid ferrous core of the same external dimensions (that is, of the same volume). This lower weight for same volume (that is, lower density) is achieved through the use of lower-density materials (such as plastic), through the formation of openings or voids in the core substrate forming the core, through the use of a lattice-like frame to form the core substrate, or a combination thereof. As the core has less ferrous material than a comparable conventional EM coil, the hollow-core EM coil described herein compensates by utilizing thin metal foil wrapping with high magnetic permeability, and thus resulting in an EM coil that is considerably lighter while being capable of generating an EM field of nearly the same strength as the comparable conventional solid-core EM coil. As such, the term "high magnetic permeability" is defined herein as a magnetic permeability higher than iron (Fe), or approximately $6.3 \times 10^{-3}$ µ (H/m). As such, a hollow-core EM coil has a lower weight than a conventional solid-core EM coil of comparable dimensions, and thus is less likely to contribute to user fatigue when implemented in a user-held or user-mounted device, and also is less susceptible to being dislodged as a result of a drop impact of such device.

Figure 2:
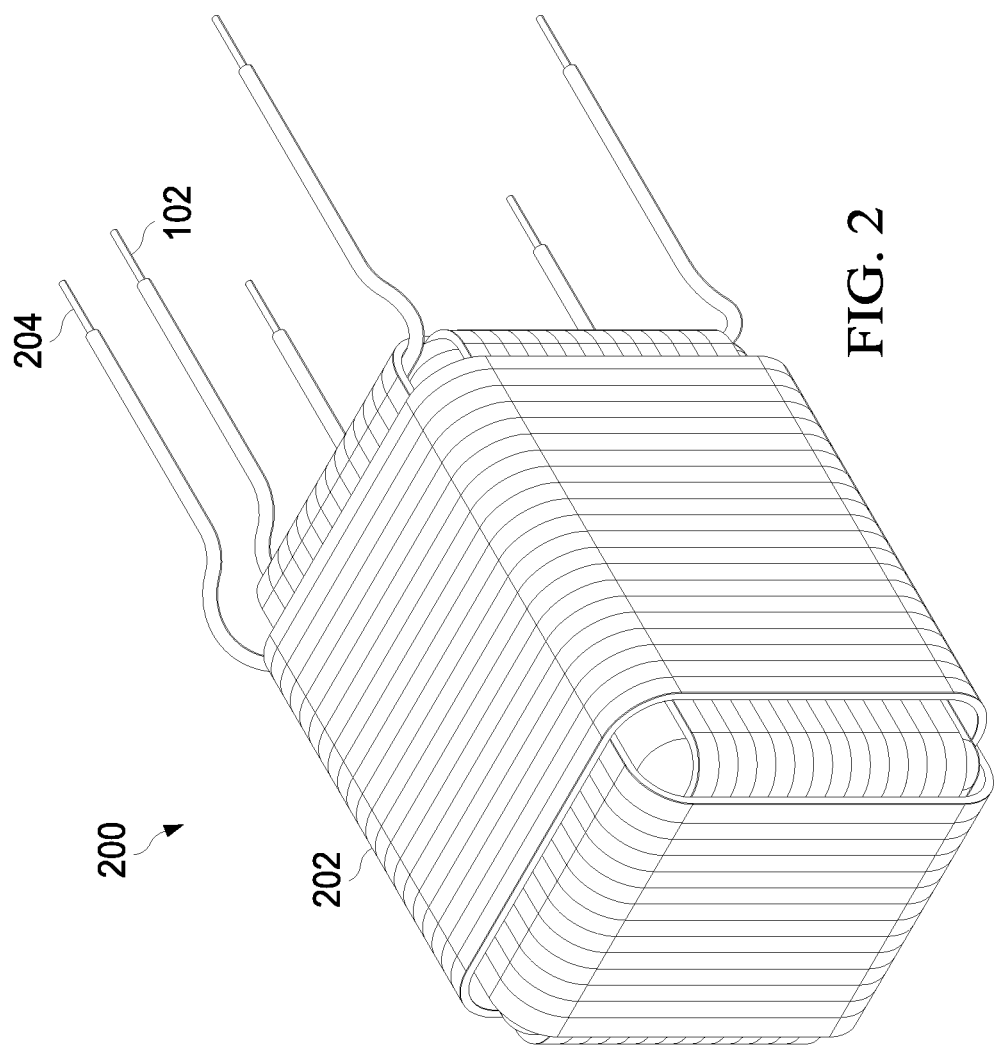
FIG. 2 is a diagram illustrating a hollow-core EM coil with edge-to-edge wrappings in accordance with some embodiments.

FIG. 2 illustrates an example implementation of a hollow-core EM coil in accordance with some embodiments. In FIG. 2, a hollow-core EM coil 200 includes three sets of thin metal foil 200 wrapped in three orthogonal directions around a "hollow" plastic core substrate (not visible in FIG. 2). Each metal foil wrapping is electrically connected to a corresponding set of leads (e.g., leads 204, 205) which in turn are used either to receive an excitation AC signal so as to trigger the generation of a magnetic field in the corresponding plane by the corresponding metal foil wrapping, or to provide a voltage generated by the corresponding metal foil wrapping as a result of a generated EM field. In the embodiment of FIG. 2, the metal foil wrappings 202 extend from end-to-end relative to the external dimensions of the underlying core substrate, and thus this configuration is referred to as an "end-to-end" wrapping. Alternatively, the frame of the plastic core substrate could include corner protrusions and the metal foil wrappings are disposed between these corner protrusions. This configuration reduces strain on the metal foil wrappings at the corners, and thus this configuration is referred to herein as a "corner-relief" wrapping.

Figure 3:
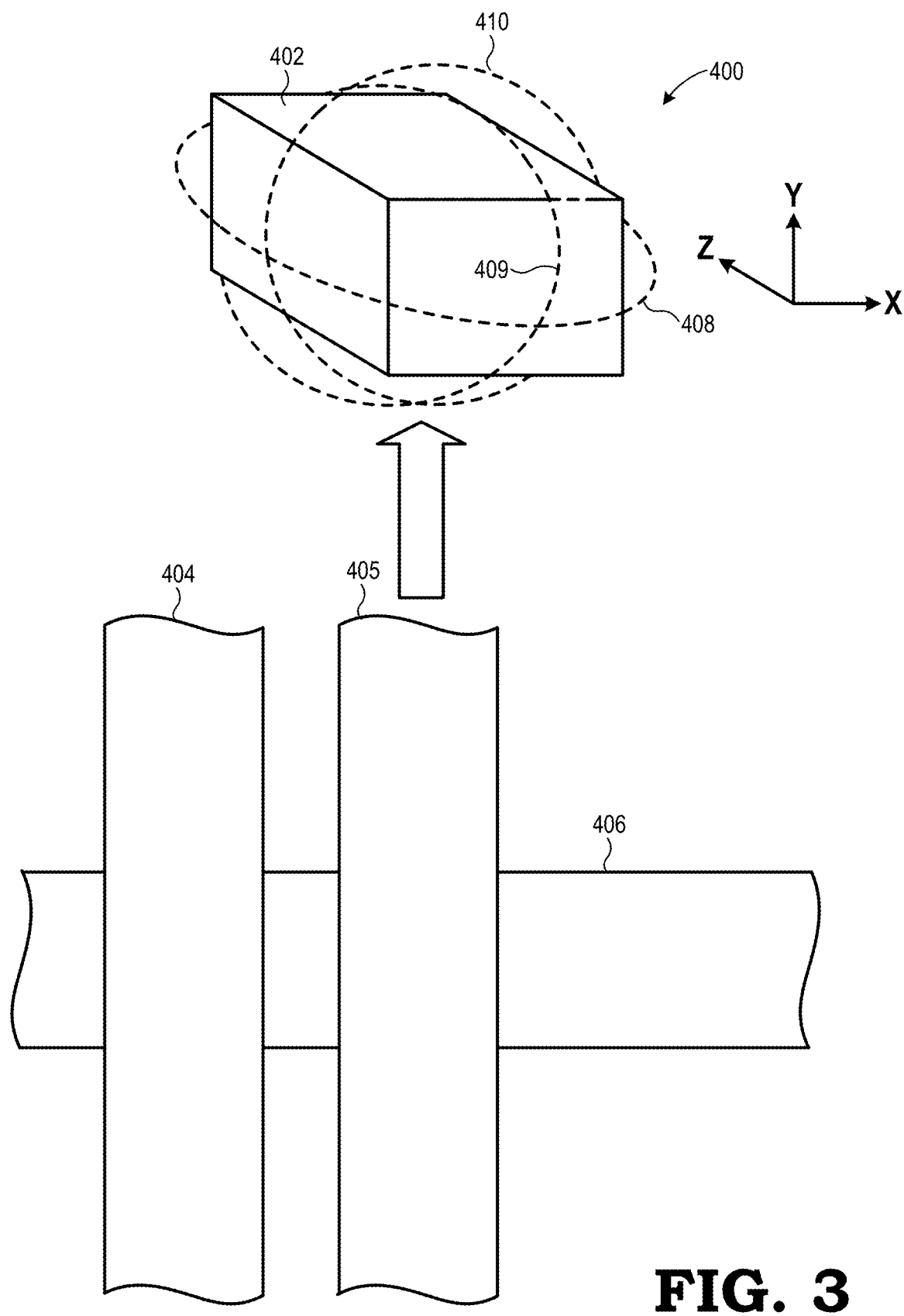
FIG. 3 is a diagram illustrating a core substrate and thin foil wrappings of a hollow-core EM coil in accordance with some embodiments.

FIG. 3 illustrates the fabrication of a hollow-core EM coil in accordance with some embodiments. As shown, the hollow-core EM coil is fabricated by wrapping a core substrate 402 with three thin metal foil strips 404, 405, 406, in three orthogonal directions 408, 409, 410, respectively. The thin metal foil strip 404 is wrapped one or more times around the core substrate 402 in direction 408, which corresponds to the X-Z plane. The thin metal foil strip 405 is wrapped one or more times around the core substrate 402 in direction 409, which corresponds to the Y-Z plane. The thin metal foil strip 406 is wrapped one or more times around the core substrate 402 in direction 410, which corresponds to the X-Y plane. Each of the thin metal foil strips 404, 405, 406 is electrically coupled to one or more leads (not shown). As explained above, the thin metal foil strips are composed of a material with a high magnetic permeability, that is, a magnetic permeability higher than iron. Examples of such materials include, for example, amorphous metal foils, such as Metglas 2714A foil (an amorphous alloy foil available from Metglas, Inc.), nanocrystalline alloy foil available from Metglas, Inc., FINEMET® nanocrystalline alloy ribbon available from Hitachi Metals America, Inc.

Figure 4:
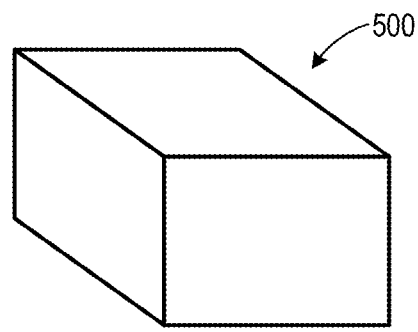
FIGS. 4 and 5 are diagrams illustrating example implementations of a core substrate of a hollow-core EM coil in accordance with some embodiments.
Figure 5:
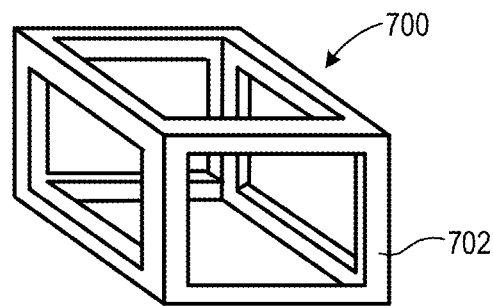

As explained above, the core substrate of a hollow-core EM coil is "hollow" in that it has less mass than a conventional solid-ferrite or solid-ferrous core of comparable size. FIGS. 4 and 5 illustrate examples of such hollow-core substrates for use in a hollow-core EM coil in accordance with some embodiments. In FIG. 4, a core substrate 500 is solid (that is, absent of voids or other holes or openings), but composed of a material lighter than ferrite or iron, such as a plastic material. In FIG. 5, a core substrate 700 is formed as a lattice-like framework 702 in that the material of the framework 702 constitutes less than 50 percent of the volume defined by the external dimensions of the core substrate 700. As such, whether composed of ferrite or iron, or of a lighter material, the core substrate 700 is substantially lighter than a solid ferrite or ferrous core of the same volume.

The use of a lighter hollow-core along with higher magnetic permeability metal foil wrappings permits a hollow-core EM coil to be fabricated with a substantially lower weight while providing almost the same performance as a solid core EM coil of comparable dimensions. To illustrate, the use of a plastic framework for the core substrate as shown in FIG. 7, along with thin metal foil wrappings, permits the construction of an hollow-core EM coil with approximately 50% weight reduction while achieving 95% of the EM sensing performance (for end-to-end wrapping configurations or 75-89% of the EM sensing performance (for corner-relief wrapping configurations) of a conventional solid-ferrite-core EM coil of comparable external dimensions when tested using an excitation signal at 60 kilohertz (kHz) and at a 0.5 meter separation for testing purposes.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An electromagnetic (EM) coil for position tracking, the EM coil comprising:
    a core substrate; and
    thin metal foil wound around the core substrate along three orthogonal axes, wherein the core substrate is a lattice-like framework that includes protrusions to position the thin metal foil and the thin metal foil comprises a thin amorphous metal foil.

2. The EM coil of claim 1, wherein:
    the core substrate is a solid block of material with one or more openings formed therein.

3. The EM coil of claim 1, wherein:
    the core substrate is a hollow frame of material.

4. The EM coil of claim 3, wherein the material is a ferrous material.

5. The EM coil of claim 3, wherein the material is a ferrite material.

6. The EM coil of claim 3, wherein the material is a plastic material.

7. The EM coil of claim 1, wherein:
    the core substrate is a solid block of plastic.

8. An electromagnetic (EM) coil for position tracking, the EM coil comprising:
    a core substrate; and
    thin metal foil wound around the core substrate along three orthogonal axes, wherein the core substrate is a lattice-like framework that includes protrusions to position the thin metal foil and the thin metal foil comprises a thin nanocrystalline metal foil.

9. An augmented reality/virtual reality (AR/VR) system comprising:
    a head mounted display (HMD) device;
    at least one hand-held controllers; and
    a tracking system for tracking a position of at least one of the HMD device or the at least one hand-held controller, the tracking system comprising an electromagnetic (EM) coil composed of a core substrate and thin metal foil wound around the core substrate along three orthogonal axes, wherein the thin metal foil comprises one of: a thin amorphous metal foil; and a thin nanocrystalline metal foil.

10. The AR/VR system of claim 9, wherein:
    the core substrate is one of: a solid block of material with one or more openings formed therein; and a hollow frame of material.

11. The AR/VR system of claim 10, wherein the material is one of: a ferrous material; a ferrite material; and a plastic material.

12. The AR/VR system of claim 9, wherein:
    the core substrate is a solid block of plastic.

13. An augmented reality/virtual reality (AR/VR) system comprising:
    a head mounted display (HMD) device;
    at least one hand-held controllers; and
    a tracking system for tracking a position of at least one of the HMD device or the at least one hand-held controller, the tracking system comprising an electromagnetic (EM) coil composed of a core substrate and thin metal foil wound around the core substrate along three orthogonal axes, wherein the core substrate comprises corner protrusions between which the thin metal foil is positioned.

14. A method for tracking a component of an augmented reality/virtual reality (AR/VR) system using an electromagnetic (EM) field, the method comprising:
    generating the EM field using an EM coil, the EM coil being included in the AR/VR system and composed of a core substrate and thin metal foil wound around the core substrate along three orthogonal axes, wherein the thin metal foil comprises one of: a thin amorphous metal foil; and a thin nanocrystalline metal foil.

15. The method of claim 14, wherein the core substrate is one of: a solid block of material with one or more openings formed therein; and a hollow frame of material.

16. The method of claim 15, wherein the material is one of: a ferrous material;
    a ferrite material; and a plastic material.

17. A method for tracking a component of an augmented reality/virtual reality (AR/VR) system using an electromagnetic (EM) field, the method comprising:
    sensing the EM field using an EM coil, the EM coil being included in the AR/VR system and composed of a core substrate and thin metal foil wound around the core substrate along three orthogonal axes, wherein the thin metal foil comprises one of: a thin amorphous metal foil; and a thin nanocrystalline metal foil.

18. The method of claim 17, wherein the core substrate is one of:
    a solid block of material with one or more openings formed therein; and a hollow frame of material.

19. The method of claim 18, wherein the material is one of: a ferrous material;
    a ferrite material; and a plastic material.

* * * * *